United States Patent

Oshima

(10) Patent No.: US 12,238,260 B2
(45) Date of Patent: Feb. 25, 2025

(54) DEVICE, CAPTURING DEVICE, CONTROL METHOD, AND STORAGE MEDIUM OPERABLE FOR OUTPUTTING PAIR OF CAPTURED IMAGES PERTAINING TO BINOCULAR STEREOPSIS

(71) Applicant: CANON KABUSHIKI KAISHA, Tokyo (JP)

(72) Inventor: Koji Oshima, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 141 days.

(21) Appl. No.: 17/824,770

(22) Filed: May 25, 2022

(65) Prior Publication Data

US 2022/0385875 A1    Dec. 1, 2022

(30) Foreign Application Priority Data

May 31, 2021 (JP) ................. 2021-091809

(51) Int. Cl.
*H04N 13/156* (2018.01)
*H04N 13/239* (2018.01)
*H04N 13/194* (2018.01)

(52) U.S. Cl.
CPC ......... *H04N 13/156* (2018.05); *H04N 13/239* (2018.05); *H04N 13/194* (2018.05)

(58) Field of Classification Search
CPC .. H04N 13/156; H04N 13/239; H04N 13/194; H04N 13/296; H04N 13/218
USPC .......................................................... 348/47
See application file for complete search history.

(56) References Cited

U.S. PATENT DOCUMENTS

| | | | | |
|---|---|---|---|---|
| 8,654,196 B2* | 2/2014 | Yokota | ................... | H04N 7/181 348/139 |
| 2013/0278730 A1* | 10/2013 | Hasegawa | ............ | H04N 13/271 348/49 |
| 2016/0173856 A1* | 6/2016 | Naito | ................... | H04N 13/271 348/46 |
| 2016/0301916 A1* | 10/2016 | Zhang | ........................ | G06T 7/73 |
| 2017/0251193 A1* | 8/2017 | Zhou | .................... | H04N 13/239 |
| 2019/0028640 A1* | 1/2019 | Kanda | ....................... | G06T 3/20 |
| 2019/0297268 A1* | 9/2019 | Shoda | .................... | H04N 25/77 |
| 2020/0213487 A1* | 7/2020 | Nakata | ................... | H04N 23/55 |

FOREIGN PATENT DOCUMENTS

JP    2013-038640 A    2/2013

* cited by examiner

*Primary Examiner* — Susan E. Hodges
(74) *Attorney, Agent, or Firm* — CANON U.S.A., INC. IP DIVISION

(57) ABSTRACT

A device is operable to output, regarding a subject, a pair of captured images pertaining to binocular stereopsis. The device obtains, regarding a plurality of capturing systems arranged to be a predetermined distance apart, a group of captured images in which the subject is captured, wherein the device obtains, regarding at least one capturing system among the plurality of capturing systems, a plurality of captured images pertaining to luminous fluxes that have each passed a different pupil region, determines, regarding the pair of captured images, a baseline length to be set, and selects, from among the group of obtained captured images, the pair of captured images based on the determined baseline length to be set and output the pair of captured images.

12 Claims, 6 Drawing Sheets

DEVICE, CAPTURING DEVICE, CONTROL METHOD, AND STORAGE MEDIUM OPERABLE FOR OUTPUTTING PAIR OF CAPTURED IMAGES PERTAINING TO BINOCULAR STEREOPSIS

BACKGROUND

Technical Field

The aspect of the embodiments relates to a device, a capturing device, a control method, and a storage medium and relates particularly to an image capturing technique for capturing a group of images that enables binocular stereopsis.

Description of the Related Art

By capturing a subject from positions that are spaced a baseline length apart, it is possible to obtain a set of captured images that realizes binocular stereopsis. A stereoscopic effect is perceived by a difference in appearance (parallax) between these captured images, but the perceived degree of stereoscopic effect differs in accordance with a distance between a main subject and an image capturing device and the baseline length. Japanese Patent Laid-Open No. 2013-038640 discloses an image capturing device for realizing image capturing that achieves a suitable stereoscopic effect for a main subject, when, regarding the capturing of a set of captured images, image capturing is performed twice by moving (sliding) the image capturing device. Specifically, in Japanese Patent Laid-Open No. 2013-038640, when performing image capturing pertaining to one eye, a baseline length at which the stereoscopic effect is suitable is determined based on an image capturing distance and a focal length of the main subject. Then, a prediction image pertaining to image capturing from a position to which the device is slid the base line length is generated, and when a movement of the image capturing device which causes the prediction image and a through-the-lens image to coincide is detected, image capturing pertaining to the other eye is performed.

In Japanese Patent Laid-Open No. 2013-038640, when image capturing pertaining to the other eye is performed, the position of the image capturing device is manually slid, which generates an error in the baseline length pertaining to image capturing that is actually performed, and therefore, there is a possibility that it will not be possible to exhibit a suitable stereoscopic effect with the set of captured images that has been obtained. Further, when performing image capturing according to each eye at different timings as in Japanese Patent Laid-Open No. 2013-038640, there is a possibility that there may be a difference in horizontal lines that appear in each captured image or the focus state of each captured image, thereby generating a possibility that suitable binocular stereopsis cannot be realized.

SUMMARY

The first aspect of the embodiments provides a device operable to output, regarding a subject, a pair of captured images pertaining to binocular stereopsis, the device comprising: at least one processor and a memory coupled to the processor storing instructions that, when executed by the processor, cause the processor to function as: an obtainment unit configured to obtain, regarding a plurality of capturing systems arranged to be a predetermined distance apart, a group of captured images in which the subject is captured, wherein the obtainment unit obtains, regarding at least one capturing system among the plurality of capturing systems, a plurality of captured images pertaining to luminous fluxes that have each passed a different pupil region; a determination unit configured to determine, regarding the pair of captured images pertaining to binocular stereopsis, a baseline length to be set; and an output unit configured to select, from among the group of captured images obtained by the obtainment unit, the pair of captured images pertaining to binocular stereopsis based on the determined baseline length to be set and output the pair of captured images pertaining to binocular stereopsis.

The second aspect of the embodiments provides a device operable to output, regarding a subject, a pair of captured images pertaining to binocular stereopsis, the device comprising: at least one processor and a memory coupled to the processor storing instructions that, when executed by the processor, cause the processor to function as: a determination unit configured to determine, regarding the pair of captured images pertaining to binocular stereopsis, a baseline length to be set; a control unit configured to control, regarding a plurality of capturing systems arranged to be a predetermined distance apart, a manner of reading out pixels of a sensor that captures the subject based on the determined baseline length to be set; and an output unit configured to output, as the pair of captured images pertaining to binocular stereopsis, two captured images obtained by the readout from the sensor based on the control by the control unit regarding the plurality of optical image capturing systems, wherein the pixels of the sensor are configured to be capable of a readout regarding luminous fluxes that have each passed a different pupil region of a corresponding capturing system.

The third aspect of the embodiments provides a device, comprising: the image processing device according to the first aspect; at least one capturing system among the plurality of capturing systems; and a capturing unit configured to capture a luminous flux that has entered via the at least one capturing system.

The fourth aspect of the embodiments provides a method of controlling a device operable to output, regarding a subject, a pair of captured images pertaining to binocular stereopsis, the method comprising: obtaining, regarding a plurality of capturing systems arranged to be a predetermined distance apart, a group of captured images in which the subject is captured, wherein in the obtaining, a plurality of captured images pertaining to luminous fluxes that have each passed a different pupil region is obtained regarding at least one capturing system among the plurality of capturing systems; determining, regarding the pair of captured images pertaining to binocular stereopsis, a baseline length to be set; and selecting, from among the group of captured images obtained in the obtaining, the pair of captured images pertaining to binocular stereopsis based on the determined baseline length to be set and outputting the pair of captured images pertaining to binocular stereopsis.

The fifth aspect of the embodiments provides a method of controlling a device operable to output, regarding a subject, a pair of captured images pertaining to binocular stereopsis, the method comprising: determining, regarding the pair of captured images pertaining to binocular stereopsis, a baseline length to be set; and controlling, regarding a plurality of capturing systems arranged to be a predetermined distance apart, a manner of reading out pixels of a sensor that captures the subject based on the determined baseline length to be set; and outputting, as the pair of captured images pertaining to binocular stereopsis, two captured images obtained by the readout from the sensor based on the control in the controlling regarding the plurality of capturing systems, wherein the pixels of the sensor are configured to be capable of the readout regarding luminous fluxes that have each passed a different pupil region of a corresponding capturing system.

The sixth aspect of the embodiments provides a computer-readable storage medium storing a program for causing a computer to execute a method of controlling a device operable to output, regarding a subject, a pair of captured images pertaining to binocular stereopsis, the method comprising: obtaining, regarding a plurality of capturing systems arranged to be a predetermined distance apart, a group of captured images in which the subject is captured, wherein in the obtaining, a plurality of captured images pertaining to luminous fluxes that have each passed a different pupil region is obtained regarding at least one capturing system among the plurality of capturing systems; determining, regarding the pair of captured images pertaining to binocular stereopsis, a baseline length to be set; and selecting, from among the group of captured images obtained in the obtaining, the pair of captured images pertaining to binocular stereopsis based on the baseline length to be set that is determined in the determining and outputting the pair of captured images pertaining to binocular stereopsis.

Further features of the disclosure will become apparent from the following description of exemplary embodiments (with reference to the attached drawings).

DESCRIPTION OF THE EMBODIMENTS

Figure 1:
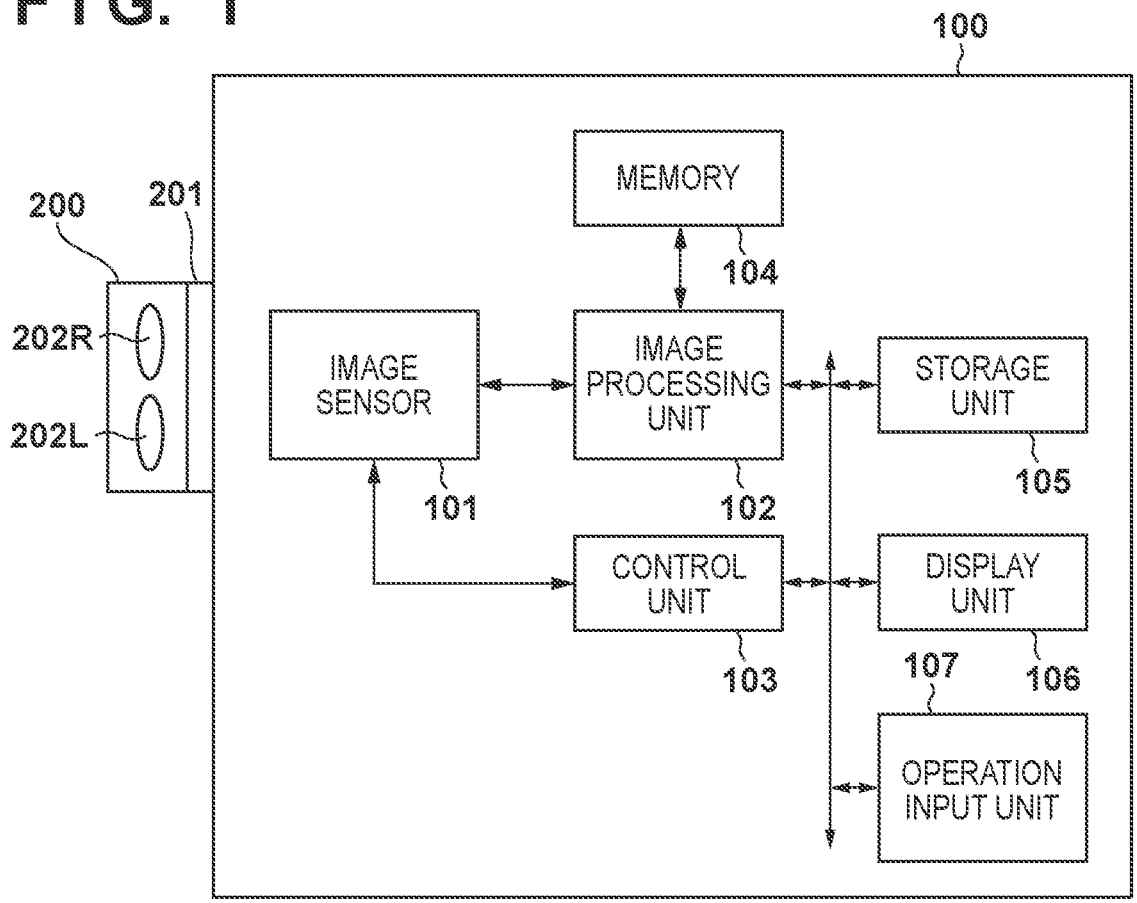
FIG. 1 is a block diagram illustrating a functional configuration of an image capturing device 100 according to an embodiment and a variation of the disclosure.

Hereinafter, embodiments will be described in detail with reference to the attached drawings. Note, the following embodiments are not intended to limit the scope of the disclosure. Multiple features are described in the embodiments, but limitation is not made to a disclosure that requires all such features, and multiple such features may be combined as appropriate. Furthermore, in the attached drawings, the same reference numerals are given to the same or similar configurations, and redundant description thereof is omitted.

Embodiment

Hereinafter, embodiments will be described in detail with reference to the attached drawings. Note, the following embodiments are not intended to limit the scope of the disclosure. Multiple features are described in the embodiments, but limitation is not made to a disclosure that requires all such features, and multiple such features may be combined as appropriate. Furthermore, in the attached drawings, the same reference numerals are given to the same or similar configurations, and redundant description thereof is omitted.

An embodiment to be described below will describe, as an example of an image processing device, an example in which the aspect of the embodiments is applied to an image capturing device that has a plurality of optical image capturing systems and is capable of capturing an image in which pupil division has been performed for luminous flux that has entered through the plurality of optical image capturing systems. However, the disclosure is applicable to any device capable of obtaining a pupil division image from image capturing devices placed a predetermined distance apart.

<Configuration of Image Capturing Device>

Figure 2:
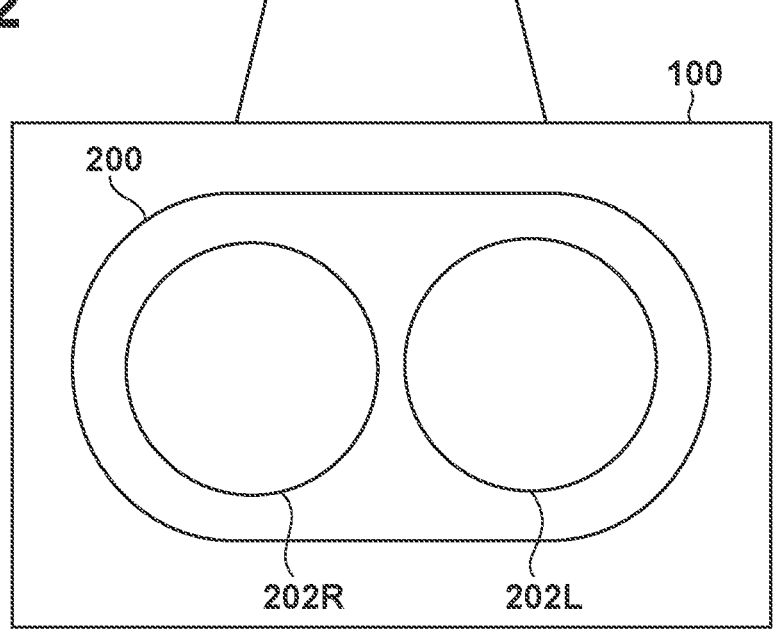
FIG. 2 is a diagram illustrating an external configuration of the image capturing device 100 and a stereoscopic image capturing lens 200 according to the embodiment of the disclosure.

FIG. 1 is a block diagram illustrating a functional configuration of an image capturing device 100 according to the present embodiment. The image capturing device 100 is a lens-interchangeable image capturing device that is configured to allow any optical image capturing system to be attached thereto and detached therefrom. In the present embodiment, description will be given assuming that, to obtain a pair of captured images pertaining to binocular stereopsis, the stereoscopic image capturing lens 200 in which two optical image capturing systems 202L and R are provided spaced a predetermined baseline length apart as illustrated in FIG. 2 is mounted so as to be attachable and detachable via a camera mount 201. FIG. 2 is a front view illustrating a front surface (a surface that faces a subject during image capturing) of the image capturing device 100 in a state in which the stereoscopic image capturing lens 200 is mounted. Description will be given assuming that, in the present embodiment, the image capturing device is configured to be lens-interchangeable and, when the stereoscopic image capturing lens 200 is mounted, capable of capturing and then storing an image for binocular stereopsis.

A control unit 103 is a control circuit such as a microcomputer having, for example, a ROM or a RAM (not illustrated) and controls the operation of each block included in the image capturing device 100. Specifically, the control unit 103 controls the operation of each block by reading out an operation program of each block stored in the ROM, and then loading it into the RAM and executing it.

An image sensor 101 is, for example, an image sensor such as a CMOS sensor or a CCD and outputs a captured image based on the luminous flux that is incident thereon via the stereoscopic image capturing lens 200. More specifically, the image sensor 101 outputs an analog image signal by photoelectrically converting an optical image formed by image capturing.

Description will be given assuming that, in the present embodiment, the lens of the image capturing device 100 can be interchanged and that the image capturing device 100 is provided with a single image sensor 101. That is, when the stereoscopic image capturing lens 200 is mounted, in the image sensor 101, optical images respectively pertaining to two optical image capturing systems 202L and R are formed in separate regions and then are photoelectrically converted, and analog image signals are outputted. In other words, since two image circles pertaining to two optical axes are formed on the image sensor 101, analog image signals to be outputted include signals pertaining to a left-eye image and a right-eye image for binocular stereopsis, and by separating these, it becomes possible to acquire a pair of captured images having a parallax. However, the embodiment of the disclosure is not limited to this, and the image capturing device 100 may be configured to have two types of image capturing systems in which a single image sensor is provided for a single optical image capturing system.

Figure 3:
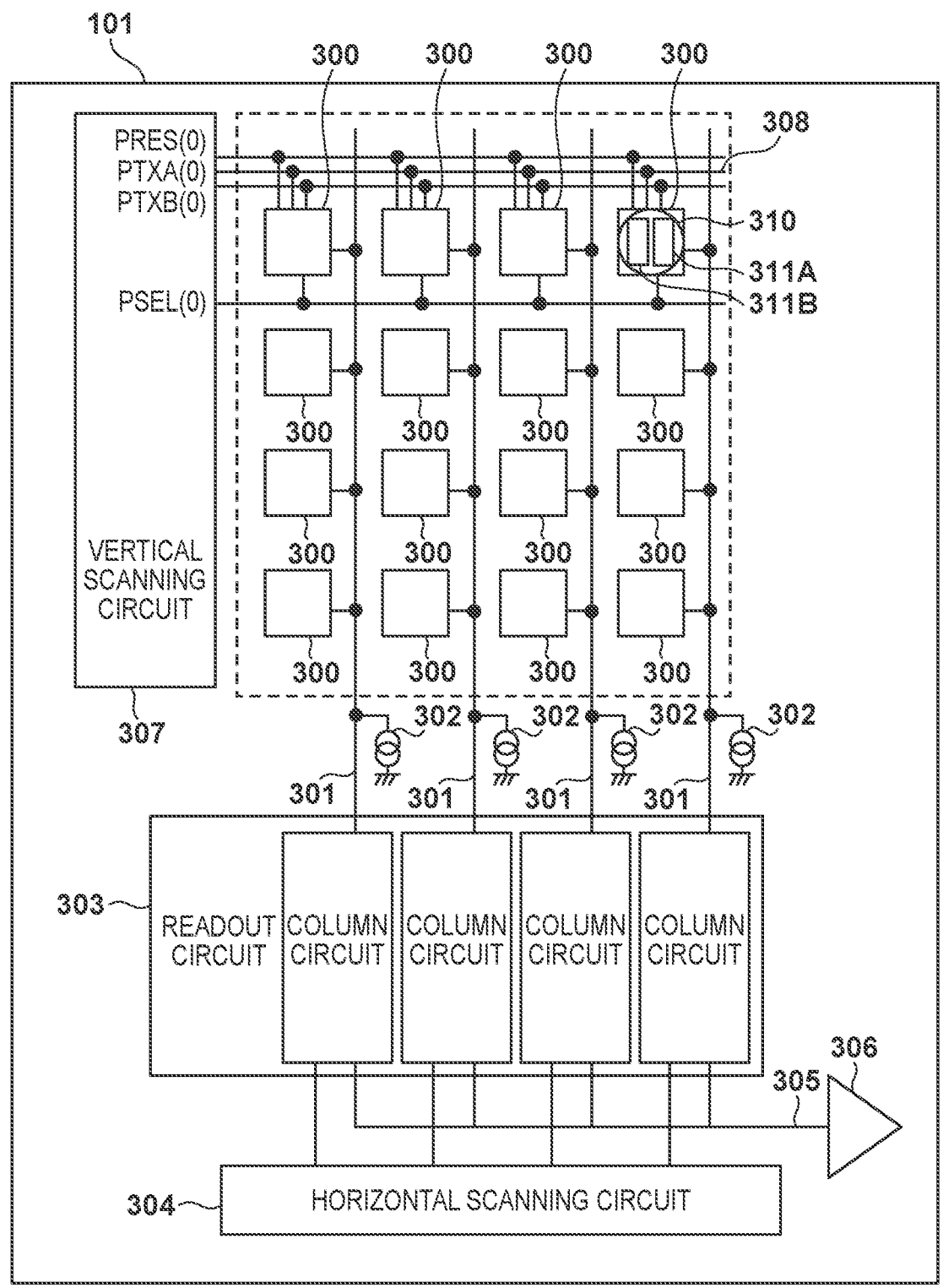
FIG. 3 is a block diagram illustrating a detailed configuration of an image sensor 101 according to the embodiment of the disclosure.

The image sensor 101 of the present embodiment is further configured by photoelectric conversion elements (photodiodes (PDs)) so as to be able to acquire a pair of captured images having a parallax for luminous flux that has entered via the respective optical image capturing systems 202. More specifically, as illustrated in FIG. 3, two PDs 311A and B are provided in one pixel (hereinafter, referred to as a unit pixel) 300 of the image sensor 101, and pupil division and capturing can be performed for the luminous flux that is incident on the position of the unit pixel 300. One unit pixel 300 is provided with one microlens 310, and each of the two PDs 311A and B accumulates a charge for the luminous flux that has passed through the different pupil regions of the exit pupil of the optical image capturing system 202. That is, each PD 311 is a divided pixel constituting the unit pixel 300 and, by mixing and adding the electric charges accumulated in the PDs 311A and B or adding the pixel values after a readout, it is possible to obtain an image signal pertaining to the entire unit pixel 300 (one pixel).

As illustrated in FIG. 3, a plurality of unit pixels 300, each of which has the above-described PDs 311A and B, are arranged on the image sensor 101 in a matrix (a grid shape). Although details will be described later, in the image capturing device 100 of the present embodiment, in order to be able to output a group of captured images pertaining to binocular stereopsis for which the state of the baseline length is made to differ, pupil division by the PDs 311A and B is made to be in the same direction as the direction of the baseline length of the stereoscopic image capturing lens 200. That is, the direction in which the PDs 311A and B are arranged in each unit pixel 300 is configured to correspond to the direction in which the optical image capturing systems 202L and R are arranged in the stereoscopic image capturing lens 200 when mounted to the image capturing device 100. In the example of FIG. 3, four rows and four columns of 16 unit pixels 300 are illustrated, but in reality, several millions to several tens of millions of unit pixels 300 are disposed on the image sensor 101.

The unit pixels 300 are sequentially selected and driven in units of rows via signal lines 308 connected to the respective rows, and a pixel signal is outputted to a vertical output line 301 which is a connection destination of each unit pixel. In FIG. 3, for visibility in the drawing, the signal line 308 is illustrated only in the 0th row; however, in reality, it is wired to each row. A current source 302 is connected to each vertical output line 301.

Pixel signals outputted to the vertical output lines 301 are read out by being transferred to a readout circuit 303 and then, by driving a horizontal scanning circuit 304, are sequentially outputted as an analog image signal via a horizontal output line 305 and an output amplifier circuit 306. Here, the readout circuit 303 is configured by a column circuit for each vertical output line 301, has a memory for storing a signal, a gain amplifier, an AD converter, and the like (not illustrated), and reads out a signal pertaining to the unit pixel 300 selected by the vertical scanning circuit 307. The vertical scanning circuit 307 controls the signal lines 308 and controls the driving of each unit pixel 300.

The image sensor 101 of the present embodiment is configured to be capable of selectively outputting a pixel signal of each PD 311 and is assumed to be capable of controlling to output a pixel signal pertaining to any of the divided pixels or output a pixel signal obtained by mixing and adding the two divided pixels. In order to facilitate understanding of the disclosure, regarding a readout for binocular stereopsis, an output signal from the PD 311A, which is a divided pixel on the right in FIG. 3, will be referred to as an A image data signal and an output signal from the PD 311B, which is a divided pixel on the left, will be referred to as B image data signal. Here, by deriving an image shift amount (a pupil division phase difference) by performing processing such as a known correlation operation for the A image data signal and the B image data signal, it is also possible to perform ranging based on an image capturing plane phase difference.

A captured image configured by the A image data signal and a captured image configured by the B image data signal both include an image pertaining to a luminous flux that has passed through the two types of optical image capturing systems 202L and R. Therefore, since the image sensor 101 of the present embodiment is capable of obtaining, for each the two optical image capturing systems 202, two types of pupil divided captured images and one type of captured image in which the two types of captured images have been combined, in principle it is possible to acquire captured images captured at six types of positions with the image sensor 101.

In the present embodiment, description will be given assuming that a vertical output line 301 and column circuit of the readout circuit 303 is provided for the PDs 311A and B included in one unit pixel 300; however, the implementation of the disclosure is not limited to this. The vertical output line 301 and the column circuit may be provided for each of the PDs 311A and B.

The analog image signal outputted from the image sensor 101 is inputted to an image processing unit 102, is subjected to A/D conversion processing, various kinds of arithmetic processing, correction processing including filtering, development processing or the like, and then is converted into image data (a digital image signal). The image processing unit 102 is an image processing circuit that executes various kinds of image processing, and in addition to various kinds of processing pertaining to image capturing, processing pertaining to the output of a pair of captured images pertaining to binocular stereopsis is also performed.

A memory 104 and a storage unit 105 are storage media such as a nonvolatile memory and a memory card for holding/storing an image signal (a captured image) outputted from the image processing unit 102. The memory 104 may be used as a work area for image processing in the image processing unit 102. The storage unit 105 stores an image capturing result when normal image capturing and image capturing for binocular stereopsis are performed.

A display unit 106 is configured to include, for example, a display device such as an LCD and a display circuit for controlling the display of an image on the display device. The display unit 106 functions as an electronic viewfinder by, for example, performing a through-the-lens display of a captured image at the time of image capturing. The display unit 106 displays a GUI pertaining to an adjustment of various settings pertaining to the operation of the image capturing device 100 such as an image capturing setting.

An operation input unit 107 is a user interface including various operation members provided in the image capturing device 100 such as a mode switching dial and a release switch, for example. The operation input unit 107 outputs a corresponding control signal to the control unit 103 when operation input to these user interfaces is detected.

In the present embodiment, description will be given assuming that processing is realized by a circuit or a processor corresponding to each block provided in the image capturing device 100 as hardware. However, the implementation of the disclosure is not limited to this, and processing of each block may be realized by a program that performs processing similar to that of each block.

<Summary of Image Capturing for Binocular Stereopsis>

Next, the summary of the processing for outputting a pair of captured images (a left-eye image and a right-eye image) pertaining to binocular stereopsis in the image capturing device 100 having this kind of configuration will be described with reference to the drawings.

Figure 4:
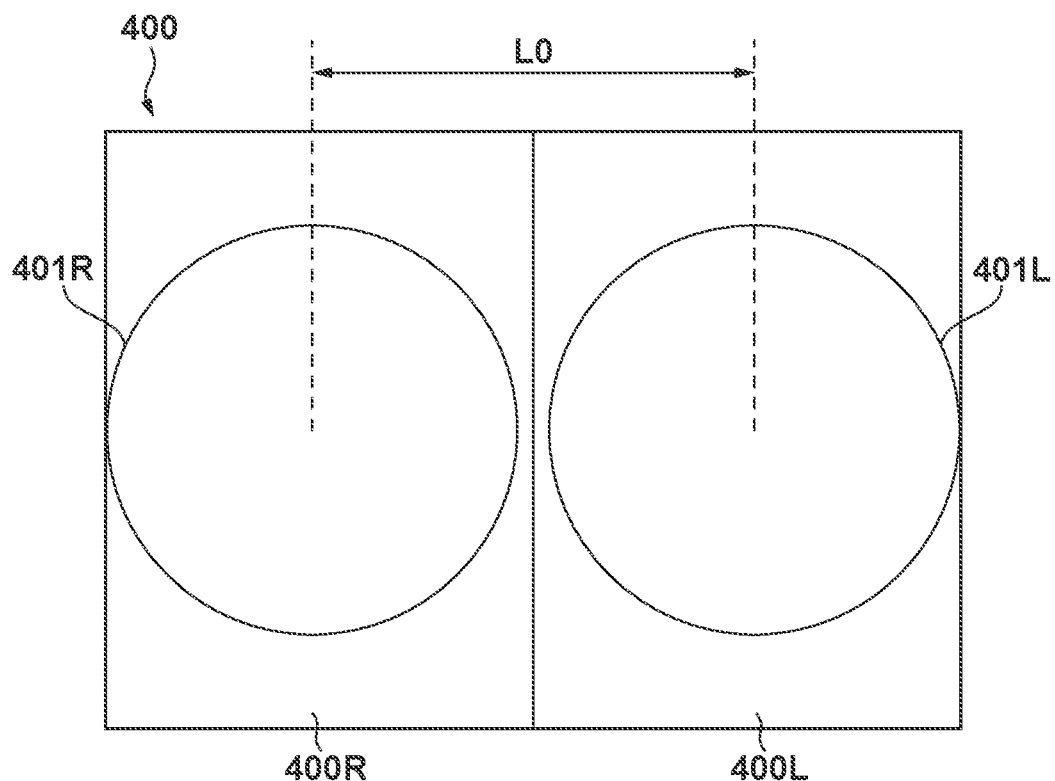
FIG. 4 is a diagram illustrating an optical image to be formed on the image sensor 101 according to the embodiment of the disclosure.

When the stereoscopic image capturing lens 200 is mounted and then image capturing is performed, as illustrated in FIG. 4, image circles 401L and R pertaining to the optical image capturing systems 202L and R are formed on an effective pixel portion 400 of the image sensor 101. Here, FIG. 4 illustrates the effective pixel portion 400 when the image sensor 101 is viewed from the front surface of the image capturing device 100 in a direction of the image capturing optical axis. As illustrated, in the effective pixel portion 400, the image circle 401L of the luminous flux pertaining to the optical image capturing system 202L and the image circle 401R of the luminous flux pertaining to the optical image capturing system 202R on the left and right in the drawing are formed. That is, the image circle 401L pertaining to the left-eye image is captured by an effective pixel portion 400L in the effective pixel portion 400, and the image circle 401R pertaining to the right-eye image is captured by an effective pixel portion 400R in the effective pixel portion 400.

By obtaining the pixel output of the PDs 311A and B for each unit pixel 300 by mixing and adding (hereinafter, referred to as summation obtainment), a pair of captured images pertaining to the image circles 401L and R can be obtained. As illustrated in FIG. 4, the pair of captured images is captured with a center-to-center distance L0 between the image circle 401L and the image circle 401R as a base length and there is a parallax corresponding to L0 between the images.

Here, L0 is determined by the distance between the optical image capturing systems 202L and R in the stereoscopic image capturing lens 200 and is fixed. Therefore, the baseline length is fixed for a pair of captured images obtained by summation obtainment, and so with binocular stereopsis, for example, when the subject is far, the stereoscopic effect to be exhibited is reduced, and when the subject is close, the stereoscopic effect may be overexaggerated. That is, when performing image capturing for binocular stereopsis using two optical image capturing systems 202L and R provided a predetermined distance apart, since the base line length is fixed, depending on the subject distance, a set of captured images to be obtained may not be able to exhibit a stereoscopic effect that is suitable for the subject.

Figure 5:
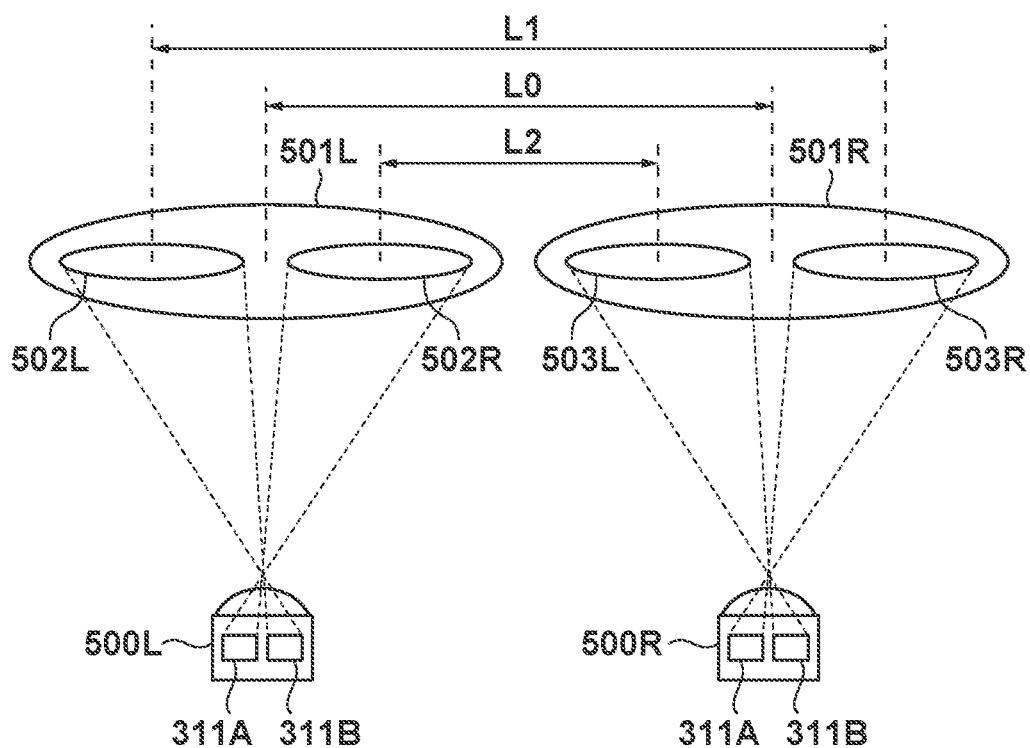
FIG. 5 is a diagram for explaining baseline lengths that can be adopted for a pair of captured images pertaining to binocular stereopsis according to the embodiment and variation of the disclosure.

In order to output a pair of captured images pertaining to binocular stereopsis exhibiting a suitable stereoscopic effect in accordance with the subject distance, the image capturing device 100 of the present embodiment can adjust the baseline length by selectively determining, from the group of captured images that can be obtained, a left-eye image and a right-eye image. Hereinafter, the relationship between pupil regions corresponding to the luminous flux to be captured and the baseline length for when selected for binocular stereopsis will be described focusing on unit pixels 500L and R disposed at corresponding positions (the same positions in each circle) of the image circles 401L and R illustrated in FIG. 5.

First, when performing summation obtainment for the pixel output for the unit pixels 500L and R, the pupil region corresponding to the pixel output is 501L and 501R, respectively. When summation obtainment is not performed for the pixel output, for the unit pixel 500L, the pupil region corresponding to the pixel output of the PD 311B is 502L and the pupil region corresponding to the pixel output of PD 311A is 502R. In addition, regarding the unit pixel 500R, the pupil region corresponding to the pixel output of the PD 311B is 503L and the pupil region corresponding to the pixel output of PD 311A is 503R. Therefore, by virtue of the image sensor 101 of the present embodiment, it becomes possible to obtain captured images corresponding to six types of image capturing positions pertaining to the pupil regions, S01L, 501R, 502L, 502R, 503L, and 503R.

Here, the baseline length regarding a pair of captured images pertaining to binocular stereopsis corresponds to the distance between the centers of mass (in space) of the pupil regions corresponding to these captured images; therefore, in the present embodiment, a manner in which the left-eye image and the right-eye image are selected is made to be different, with the baseline length L0 in the case of summation obtainment as a reference.

More specifically, when outputting a pair of captured images of a subject whose stereoscopic effect may be reduced at the baseline length L0, the image processing unit 102 selects a captured image pertaining to the pupil region 502L and the pupil region 503R, which are a combination of the longest baseline length L1. That is, in this instance, the captured image obtained from the PD 311B is selected as the left-eye image for the effective pixel portion 400L corresponding to the optical image capturing system 202L. In addition, the captured image obtained from the PD 311A is selected as the right-eye image for the effective pixel portion 400R corresponding to the optical image capturing system 202R. With this selection, the baseline length is extended to L1, and parallax between the left-eye image and the right-eye image is increased, so that the exhibited stereoscopic effect can be emphasized as compared with the case of the baseline length L0.

Meanwhile, when outputting a pair of captured images of a subject whose stereoscopic effect may be overexaggerated at the baseline length L0, the image processing unit 102 selects a captured image pertaining to the pupil region 502R and the pupil region 503L, which are a combination of the shortest baseline length L2. That is, in this instance, the captured image obtained from the PD 311A is selected as the left-eye image for the effective pixel portion 400L corresponding to the optical image capturing system 202L. In addition, the captured image obtained from the PD 311B is selected as the right-eye image for the effective pixel portion 400R corresponding to the optical image capturing system 202R. With this selection, the baseline length is shrunk to L2, and the parallax between the left-eye image and the right-eye image is decreased, so that the exhibited stereoscopic effect can be suppressed as compared with the case of the baseline length L0.

Thus in the image capturing device 100 of the present embodiment, there are provided three types of methods of selecting, from among the group of captured images that can be obtained, the images to be a pair of captured images pertaining to binocular stereopsis, and it is possible to change them based on the subject to be captured and the image capturing setting. Hereinafter, the criteria for selecting images to be a pair of captured images will be described with reference to FIG. 6.

Figure 6:
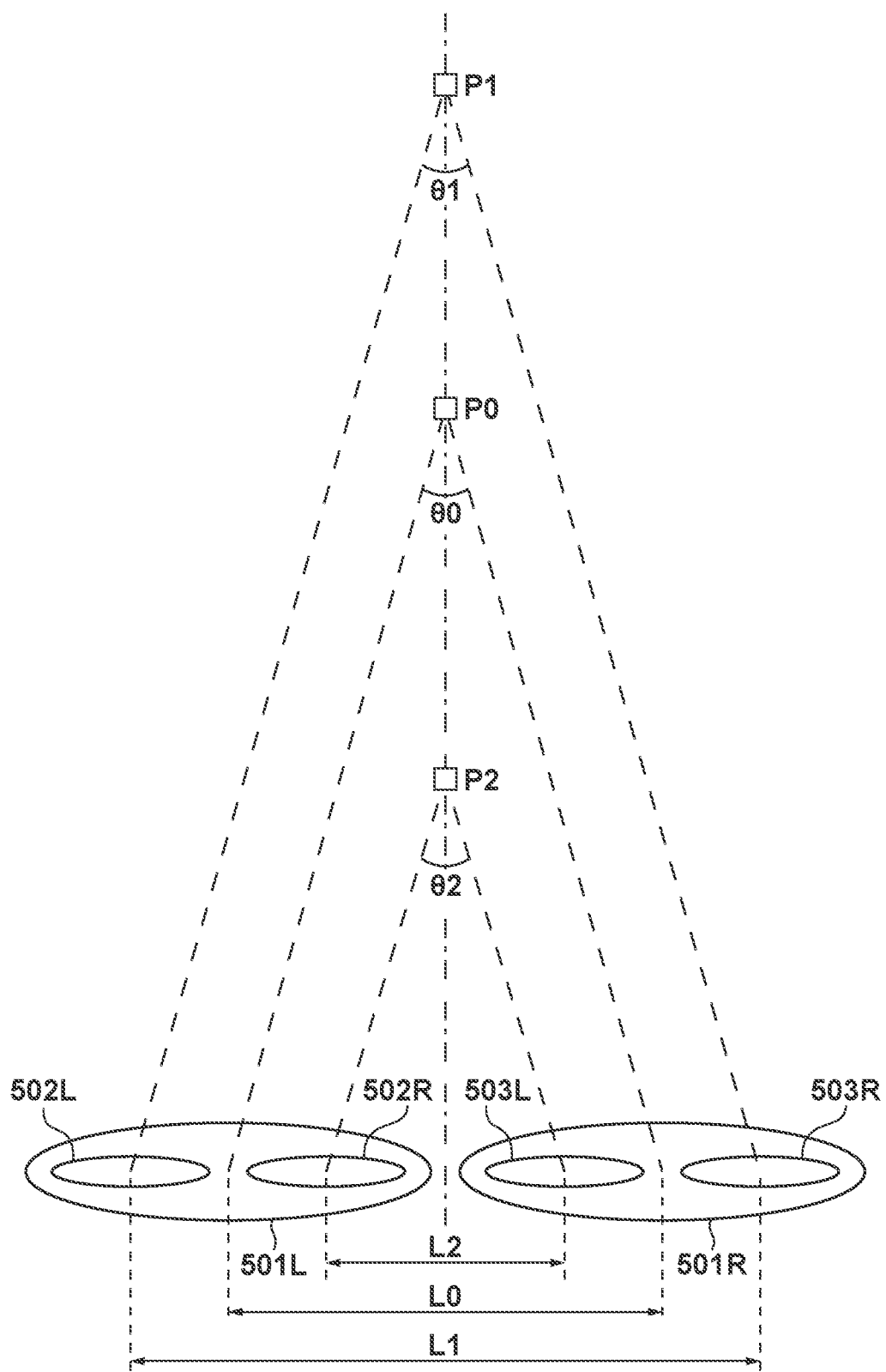
FIG. 6 is a diagram illustrating a relationship between the baseline lengths and subject distances that can be adopted according to the embodiment and variation of the disclosure.

FIG. 6 illustrates the positional relationship of the subject that exhibits a suitable stereoscopic effect, for the three types of baseline lengths L0, L1, and L2, which can be realized as a pair of captured images pertaining to binocular stereopsis in the image capturing device 100 of the present embodiment (the upper direction in the drawing is the depth direction). A suitable stereoscopic effect is determined in accordance with a parallax angle (convergence angle) realized when connecting the two image capturing positions spaced the baseline length apart (centers of mass of each exit pupil) and the subject. In FIG. 6, for each of the baseline lengths L0, L1, and L2, subjects P0, P1, and P2, which are present at the positions at which the parallax angles are θ0, θ1, and θ2 by which a suitable stereoscopic effect is exhibited are illustrated. That is, when the group of captured images (pertaining to pupil regions 501L and R) obtained by summation obtainment regarding the optical image capturing systems 202L and R is used for binocular stereopsis, the subject P0 is a subject that exhibits a suitable stereoscopic effect. With binocular stereopsis using the captured image pertaining to the pupil region 502L regarding the optical image capturing system 202L and the captured image pertaining to the pupil region 503R regarding the optical image capturing system 202R, the subject P1 exhibits a suitable stereoscopic effect. With binocular stereopsis using the captured image pertaining to the pupil region 502R regarding the optical image capturing system 202L and the captured image pertaining to the pupil region 503L regarding the optical image capturing system 202R, the subject P2 exhibits a suitable stereoscopic effect.

As illustrated, the subjects P0, P1, and P2 that exhibit a stereoscopic effect that is suitable at the three types of baseline lengths L0, L1, and L2 each have a different subject distance (a subject distance of P2< a subject distance of P0< a subject distance of P1). Description will be given assuming that, in the present embodiment, the methods of selecting a pair of captured images pertaining to binocular stereopsis are made to be different based on the subject distance of the main subject pertaining to image capturing. In the following, the subject distance that is the distance to the subject P1 or longer is referred to as a long distance, the subject distance that is less than the distance to the subject P0 as a short distance, and the subject distance between these as a medium distance. Then, when the main subject is present at a long distance, a pair of captured images pertaining to the baseline length L1 is selected for binocular stereopsis; at a medium distance, a pair of captured images pertaining to the baseline length L0; and at a short distance, a pair of captured images pertaining to the baseline length L2.

<Image Output Processing>

Figure 7:
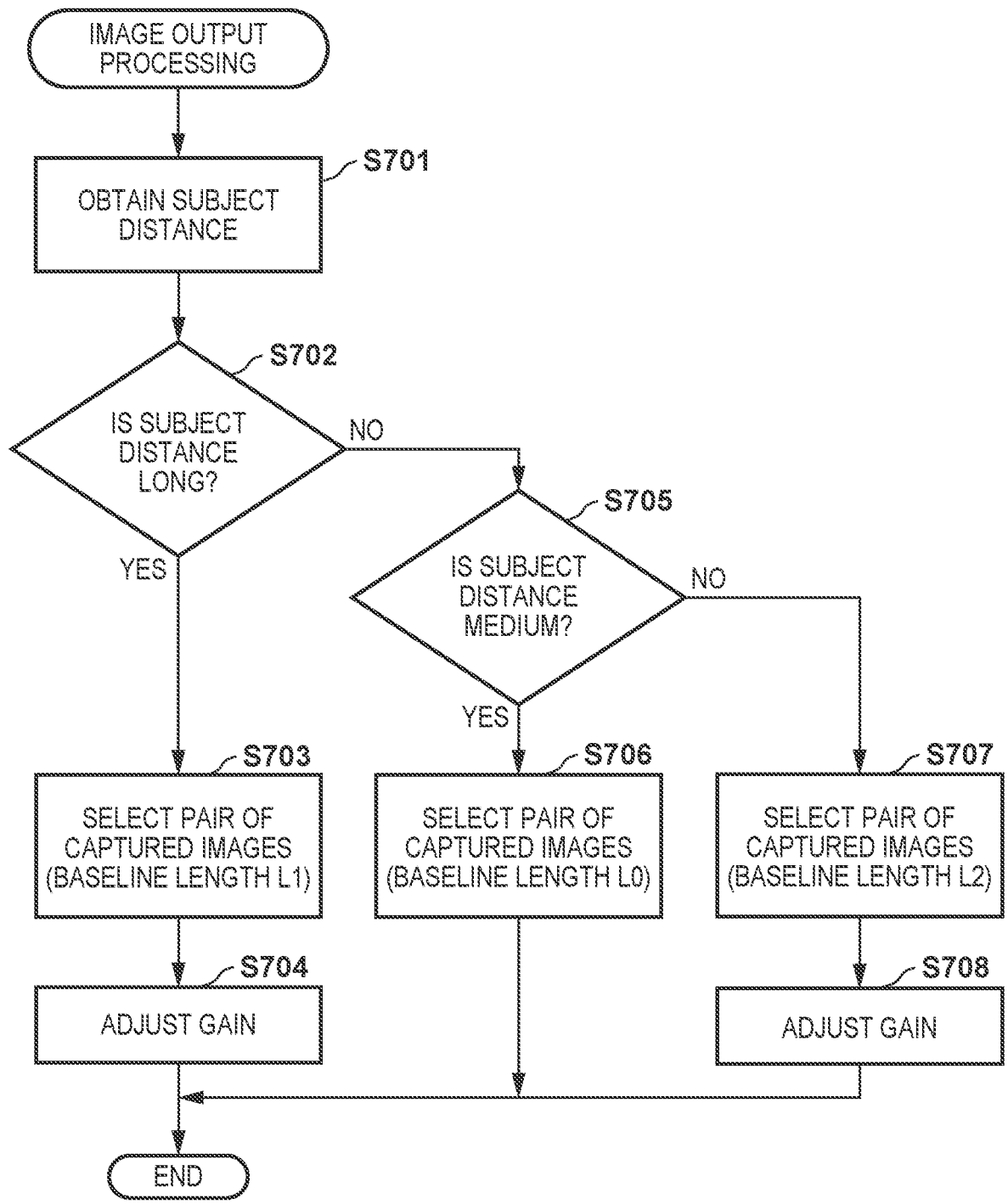
FIG. 7 is a flowchart for explaining image output processing executed by the image capturing device 100 according to the embodiment and variation of the disclosure.

Detailed processing will be described regarding the image output processing executed for image capturing pertaining to binocular stereopsis in the image capturing device 100 of the present embodiment having this kind of configuration with reference to the flowchart of FIG. 7. The processing corresponding to the flowchart can be realized by, for example, the control unit 103 reading the corresponding processing program stored in the ROM, loading it into the RAM, and executing it. Description will be given assuming that the present image output processing is started when, for example, an image capturing mode pertaining to binocular stereopsis is selected and then an image capturing instruction is made. Regarding the image capturing, it is assumed that a captured image is outputted from the image sensor 101 in a manner in which an image signal pertaining to the PD 311L and an image signal pertaining to a PD 311R can be separated.

In step S701, the control unit 103 obtains information on the subject distance of the main subject. The subject distance of the main subject may be obtained, for example, by performing a correlation operation on the A image data signal and the B image data signal pertaining to image capturing performed prior to the image capturing or by another technique.

In step S702, the control unit 103 determines whether the subject distance of the main subject is a long distance. That is, the control unit 103 determines whether the subject distance of the main subject is equal to or greater than the distance to the subject P1 according to FIG. 6. When it is determined that the subject distance of the main subject is a long distance, the control unit 103 transitions the processing to step S703, and when it is determined that it is not a long distance, the control unit 103 transitions the processing to step S705.

In step S703, under the control of the control unit 103, the image processing unit 102 selects, as a pair of captured images pertaining to binocular stereopsis, the two captured images whose relationship is the baseline length L1. Specifically, for the region of the effective pixel portion 400L, the image processing unit 102 selects, as a left-eye image, a captured image based on the image signal obtained from the PD 311B. In addition, for the region of the effective pixel portion 400R, the image processing unit 102 selects, as a right-eye image, a captured image based on the image signal obtained from the PD 311A. That is, for the main subject whose subject distance is determined to be a long distance, the image processing unit 102 determines the baseline length for a pair of captured images pertaining to binocular stereopsis to be L1 and, based on this, selects and outputs the corresponding two captured images.

In step S704, under the control of the image sensor 101, for a pair of captured images selected in step S703, the image processing unit 102 adjusts gains of the respective captured images by subjecting them to amplification processing so as to compensate for a decrease in the pixel output due to pixel division. The image processing unit 102 transmits the pair of captured images after gain adjustment to the storage unit 105 and stores them.

Meanwhile, when it is determined that the subject distance of the main subject is not a long distance in step S702, in step S705, the control unit 103 determines whether the subject distance is a medium distance. That is, the control unit 103 determines whether the subject distance of the main subject is equal to or greater than the distance to the subject P0 according to FIG. 6. When it is determined that the subject distance of the main subject is a medium distance, the control unit 103 transitions the processing to step S706 and, when it is determined that it is not a medium distance (is a short distance), the control unit 103 transitions the processing to step S707.

In step S706, under the control of the control unit 103, the image processing unit 102 selects, as a pair of captured images pertaining to binocular stereopsis, the two captured images whose relationship is the baseline length L0. Specifically, for both regions of the effective pixel portions 400L and R, the image processing unit 102 selects, as the left-eye image and the right-eye image, the captured images based on an image signal obtained (summation obtainment) from the PDs 311A and B. Then, the image processing unit 102 transmits the pair of these captured images to the storage unit 105 and stores them. That is, for the main subject whose subject distance is determined to be a medium distance, the image processing unit 102 determines that the baseline length between a pair of captured images pertaining to binocular stereopsis to be L0 and, based on this, selects the corresponding two captured images or sums captured images pertaining to the divided pixels and then outputs the result.

Meanwhile, when it is determined in step S705 that the subject distance of the main subject is a short distance, in step S707, under the control of the control unit 103, the image processing unit 102 selects, as a pair of captured images pertaining to binocular stereopsis, two captured images whose relationship is the baseline length L2. Specifically, for the region of the effective pixel portion 400L, the image processing unit 102 selects, as a left-eye image, a captured image based on the image signal obtained from the PD 311A. In addition, for the region of the effective pixel portion 400R, the image processing unit 102 selects, as a right-eye image, a captured image based on the image signal obtained from the PD 311B. That is, for the main subject whose subject distance is determined to be a short distance, the image processing unit 102 determines that the baseline length between a pair of captured images pertaining to binocular stereopsis to be L2 and, based on this, selects and outputs the corresponding two captured images.

In step S708, under the control of the image sensor 101, for a pair of captured images selected in step S707, the image processing unit 102 adjusts gains of the respective captured images by subjecting them to amplification processing so as to compensate for a decrease in the pixel output due to pixel division. The image processing unit 102 transmits the pair of captured images after gain adjustment to the storage unit 105 and stores them.

In this way, it is possible to selectively assign, as the left-eye image and the right-eye image, captured images whose baseline length varies in accordance with the subject distance, and thereby it becomes possible to output an image for binocular stereopsis exhibiting a suitable stereoscopic effect.

Although description has been given for a manner in which image signals of a pair of captured images pertaining to binocular stereopsis are extracted from the obtained output of the image sensor 101 in the image output processing of the present embodiment, the implementation of the disclosure is not limited to this. For example, configuration may be taken so as to output the image for binocular stereopsis that exhibits a suitable stereoscopic effect by controlling the manner of reading out the image sensor 101 in accordance with the subject distance (from which of the PDs 311A and B to read). More specifically, configuration may be taken so as to output the image for binocular stereopsis from the image sensor 101 by controlling the manner of reading out each unit pixel 300 of the image sensor 101 based on the result of determination of the baseline length to be set based on the subject distance of the main subject.

For example, when the baseline length to be set is L1, the control unit 103 controls the operation of the image sensor 101 so that the readout operation is performed only for the PD 311A regarding the unit pixel 300 included in the region of the effective pixel portion 400L. The control unit 103 controls the operation of the image sensor 101 so that the readout operation is performed only for the PD 311B regarding the unit pixel 300 included in the region of the effective pixel portion 400R. In addition, for example, when the baseline length to be set is L0, the control unit 103 controls the operation of the image sensor 101 so as to add the PDs 311A and B regarding the unit pixel 300 included in the regions of the effective pixel portions 400L and R and then read out the result.

Further, in the present embodiment, description has been given for a manner of determining the baseline length pertaining to a pair of captured images to be outputted based only on the subject distance of the main subject; however, the embodiment of the disclosure is not limited to this. For example, since the image capturing angle of view can change depending on the focal length or the like of the stereoscopic image capturing lens 200, configuration may be taken so as to determine the baseline length in accordance with the size of an image of the main subject in the image. Specifically, configuration may be taken so as to, when the focal length is X1, set the threshold of the subject distance pertaining to the determination of the baseline length based on the distance to P0 and P1 according to FIG. 6 and, when the focal length is X2, which is longer than X1, change the threshold to a distance to the subjects P2 and P3 (<P2), which is shorter.

Further, in the present embodiment, description has been given for a manner of outputting, from the six types of captured images that can be obtained from the output of the image sensor 101, one of combinations corresponding to the baseline length L0, the longest baseline length L1, and the shortest baseline length L2 of the optical image capturing systems 202L and R. However, the implementation of the disclosure is not limited to this, and it is needless to say that configuration may be taken so as to be able to output any combination of obtainable baseline lengths. That is, the implementation of the disclosure is not limited to a manner of selecting the left-eye image from the pixel output of the region of the effective pixel portion 400L pertaining to the optical image capturing system 202L and selecting the right-eye image from the pixel output of the region of the effective pixel portion 400R pertaining to the optical image capturing system 202R and then outputting them.

Description has been given assuming that, in the present embodiment, by performing summation obtainment from the PDs 311A and B provided in the unit pixel 300, a captured image pertaining to the pupil region that (is not divided and) has an optical axis of the corresponding optical image capturing system 202 in the center of mass position can be obtained and then selected. However, when implementing the disclosure, the captured image obtained by combining the pixel output pertaining to different pupil regions of one optical image capturing system is not limited to those corresponding to the pupil region that is not divided. That is, for example, configuration may be taken so as to, by changing the manner of combining these pixel outputs, such as weighted addition, enable generation of captured images pertaining to the pupil regions of different center of mass positions and then output them as a pair of captured images pertaining to binocular stereopsis. Thus, it is possible to finely adjust the baseline length pertaining to binocular stereopsis, which makes it possible to output a pair of captured images exhibiting a more suitable stereoscopic effect.

In the present embodiment, description has been given for an example of using the image sensor 101 capable of obtaining the luminous flux received by one unit pixel 300 by dividing it into two in the baseline length direction of the stereoscopic image capturing lens 200; however, the implementation of the disclosure is not limited to this. That is, the manner of pupil division is not limited to the example of FIG. 3 and may be realized by arranging three or more PDs 311. Thus, it is possible to further increase the types of combination of baseline lengths that can be obtained from the output of the image sensor 101. The pupil division need not be performed by placing a plurality of PDs 311 and, for example, may be realized by providing a light shielding member for limiting the luminous flux to be incident on the PD 311. In one embodiment, configuration may be taken so as to provide a plurality of openings in a light shielding member, take the luminous flux passing through the respective openings as different pixel outputs, and then, based on the combinations thereof, generate an image for binocular stereopsis.

Description has been given assuming that, in the present embodiment, captured images to be the left-eye image and the right-eye image are selected such that the image processing unit 102 becomes a predetermined baseline length in accordance with the subject distance of the main subject; however, the implementation of the disclosure is not limited to this. For example, configuration may be taken so as to reflect preferences or the like based on the user's manual input for a stereoscopic effect to be exhibited and then perform the selection of the captured image.

[Variation]

In the embodiment described above, description has been given for a manner in which the disclosure is realized in one image capturing device 100 equipped with the stereoscopic image capturing lens 200 having two optical image capturing systems 202; however, the implementation of the disclosure is not limited to this. The disclosure can be applied as long as it is a device capable of outputting a pair of captured images pertaining to binocular stereopsis based on a group of captured images obtained by capturing a subject regarding a plurality of optical image capturing systems arranged a predetermined distance apart. At this time, it is not necessary to perform image capturing in which pupil division is performed for all of the plurality of optical image capturing systems, and the disclosure is applicable as long as its feature is such that image capturing in which pupil division is performed for at least one of the optical image capturing system is performed.

Figure 8:
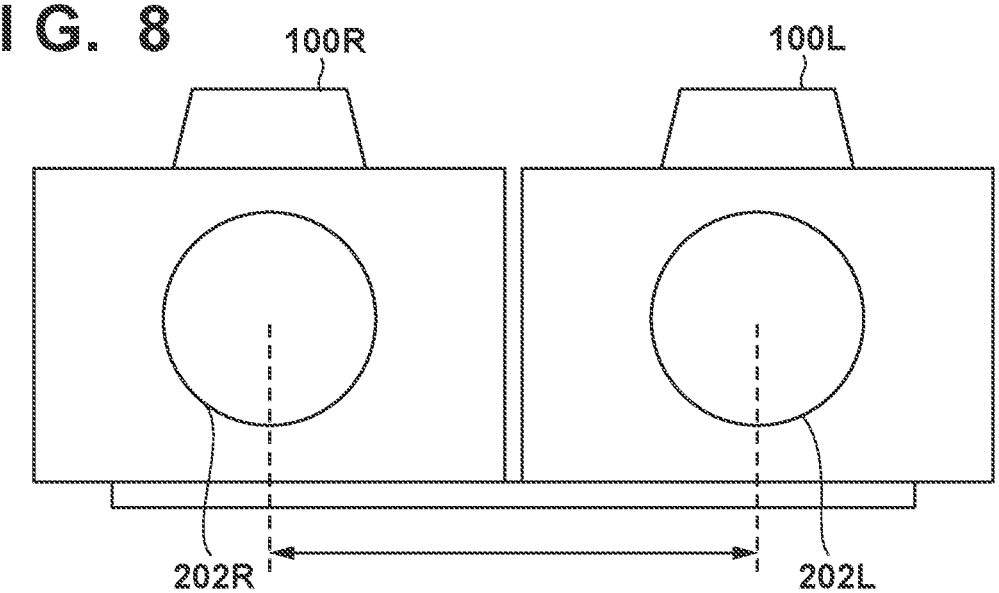
FIG. 8 is a diagram for explaining an applicable configuration according to the variation of the disclosure

For example, as illustrated in FIG. 8, configuration may be taken so as to realize the disclosure in a manner in which a plurality of image capturing devices arranged a predetermined distance apart and capable of performing image capturing in which pupil division is performed are made to work together and one of the image capturing device receives the captured images obtained by simultaneous image capturing. Alternatively, the disclosure may be realized in another device that receives the captured image from these image capturing devices.

Figure 9:
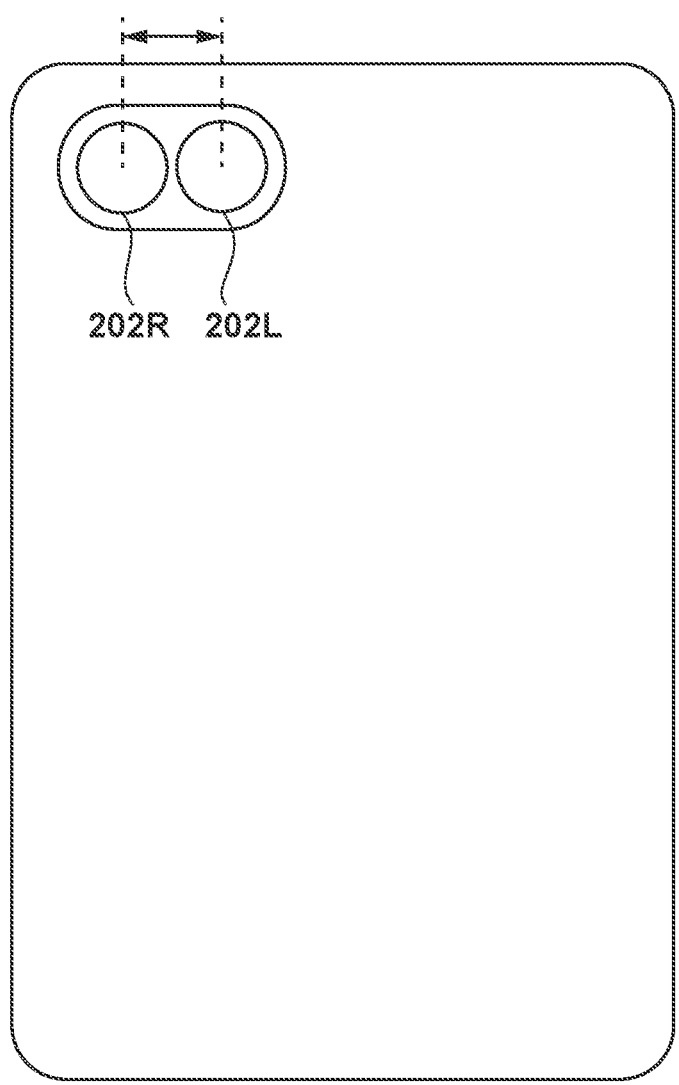
FIG. 9 is another diagram for explaining the applicable configuration according to the variation of the disclosure

Description has been given assuming that, in the embodiment described above, the two optical image capturing systems 202 have the same capabilities or have the same image capturing settings; however, the implementation of the disclosure is not limited to this. For example, as illustrated in FIG. 9, the disclosure is also applicable to an electronic device such as a smartphone comprising a plurality of image capturing systems, each of different capabilities, and capable of performing image capturing in which pupil division is performed for at least one of the image capturing systems. At this time, if there is a difference in the number of pixels of the image sensor, image capturing settings of an optical image capturing system, or the like regarding the obtained group of captured images, it need only be that, after performing the processing of converting them to have the same conditions, a pair of captured images pertaining to binocular stereopsis is selected based on the baseline length that exhibit a suitable stereoscopic effect.

OTHER EMBODIMENTS

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-091809, filed May 31, 2021, which is hereby incorporated by reference herein in its entirety.

What is claimed is:

1. A device operable to output, regarding a subject, a pair of captured images pertaining to binocular stereopsis, the device comprising:

at least one processor and a memory coupled to the processor storing instructions that, when executed by the processor, cause the processor to function as:

an obtainment unit configured to obtain, regarding a plurality of capturing systems arranged to be a predetermined distance apart, a group of captured images in which the subject is captured, wherein the obtainment unit obtains, regarding each one capturing system among the plurality of capturing systems, a plurality of captured images pertaining to luminous fluxes that have each passed a different pupil region, and the predetermined distance is fixed;

a determination unit configured to determine, regarding the pair of captured images pertaining to binocular stereopsis, a baseline length to be set based on the subject distance pertaining to the subject; and an output unit configured to select two images obtained with respect to different capturing systems as the pair of captured images pertaining to binocular stereopsis based on the baseline length to be set and output the pair of captured images pertaining to binocular stereopsis, wherein the output unit is configured to select, for one capturing system, one image among the plurality of captured images and a composite image generated by combining the plurality of captured images, and the output unit varies a combination of images to be selected depending on the baseline length to be set.

2. The device according to claim 1, wherein
the determined baseline length to be set is determined from distances between centers of mass of pupil regions corresponding to each of the plurality of captured images and the composite image.

3. A device operable to output, regarding a subject, a pair of captured images pertaining to binocular stereopsis, the device comprising:
at least one processor and a memory coupled to the processor storing instructions that, when executed by the processor, cause the processor to function as:
a determination unit configured to determine, regarding the pair of captured images pertaining to binocular stereopsis, a baseline length to be set based on the subject distance pertaining to the subject;
a control unit configured to control, regarding a plurality of capturing systems arranged to be a predetermined distance apart, a manner of reading out pixels of a sensor that captures the subject based on the determined baseline length to be set; and
an output unit configured to output, as the pair of captured images pertaining to binocular stereopsis, two images obtained with respect to different capturing systems by the readout from the sensor based on the control by the control unit regarding the plurality of capturing systems, wherein
the pixels of the sensor are configured to be capable of a readout regarding luminous fluxes that have each passed a different pupil region of a corresponding capturing system,
the predetermined distance is fixed,
the output unit is configured to output, for one capturing system, one image among a plurality of captured images each corresponding to a different pupil region and a composite image obtained by combining the plurality of captured images, and
the output unit varies a combination of images to be output depending on the baseline length to be set.

4. The device according to claim 3, wherein
the composite image is obtained by combining pixel outputs pertaining to luminous fluxes that have each passed a different pupil region of one capturing system.

5. The device according to claim 3, wherein
the determined baseline length to be set is determined from distances between centers of mass of pupil regions corresponding to each of the plurality of captured images and the composite image.

6. The device according to claim 1, wherein
the determination unit further determines the baseline length to be set based on an image capturing setting of the plurality of capturing systems.

7. A capturing device, comprising:
the device according to claim 1;
at least one capturing system among the plurality of capturing systems; and a capturing unit configured to capture a luminous flux that has entered via the at least one capturing system.

8. A method of controlling a device operable to output, regarding a subject, a pair of captured images pertaining to binocular stereopsis, the method comprising:
obtaining, regarding a plurality of capturing systems arranged to be a predetermined distance apart, a group of captured images in which the subject is captured, wherein in the obtaining, a plurality of captured images pertaining to luminous fluxes that have each passed a different pupil region is obtained regarding each capturing system among the plurality of capturing systems, and the predetermined distance is fixed;;
determining, regarding the pair of captured images pertaining to binocular stereopsis, a baseline length to be set based on the subject distance pertaining to the subject; and
selecting two images obtained with respect to different capturing systems as the pair of captured images pertaining to binocular stereopsis based on the baseline length to be set that is determined in the determining and outputting the pair of captured images pertaining to binocular stereopsis,
wherein in the selecting, for one capturing system, one image is selected among the plurality of captured images and a composite image generated by combining the plurality of captured images, and
in the selecting, a combination of images to be selected is varied depending on the baseline length to be set.

9. The method according to claim 8, wherein the determined baseline length to be set is determined from distances between centers of mass of pupil regions corresponding to each of the plurality of captured images and the composite image.

10. A method of controlling a device operable to output, regarding a subject, a pair of captured images pertaining to binocular stereopsis, the method comprising:
determining, regarding the pair of captured images pertaining to binocular stereopsis, a baseline length to be set based on the subject distance pertaining to the subject; and
controlling, regarding a plurality of capturing systems arranged to be a predetermined distance apart, a manner of reading out pixels of a sensor that captures the subject based on the baseline length to be set that is determined in the determining; and
outputting, as the pair of captured images pertaining to binocular stereopsis, two images obtained with respect to different capturing systems by the readout from the sensor based on the control in the controlling regarding the plurality of capturing systems, wherein
the pixels of the sensor are configured to be capable of the readout regarding luminous fluxes that have each passed a different pupil region of a corresponding capturing system,
the predetermined distance is fixed,
in the outputting, for one capturing system, one image is output among a plurality of captured images each corresponding to a different pupil region and a composite image obtained by combining the plurality of captured images, and
in the outputting, a combination of images to be output is varied depending on the baseline length to be set.

11. A non-transitory computer-readable storage medium storing a program for causing a computer to execute a method of controlling a device operable to output, regarding a subject, a pair of captured images pertaining to binocular stereopsis, the method comprising:

obtaining, regarding a plurality of capturing systems arranged to be a predetermined distance apart, a group of captured images in which the subject is captured, wherein in the obtaining, a plurality of captured images pertaining to luminous fluxes that have each passed a different pupil region is obtained regarding each capturing system among the plurality of capturing systems, and the predetermined distance is fixed;

determining, regarding the pair of captured images pertaining to binocular stereopsis, a baseline length to be set based on the subject distance pertaining to the subject; and selecting two images obtained with respect to different capturing systems as the pair of captured images pertaining to binocular stereopsis based on the baseline length to be set that is determined in the determining and outputting the pair of captured images pertaining to binocular stereopsis, wherein in the selecting, for one capturing system, one image is selected among the plurality of captured images and a composite image generated by combining the plurality of captured images, and in the selecting, a combination of images to be selected is varied depending on the baseline length to be set.

12. The non-transitory computer-readable storage medium according to claim 11, wherein the determined baseline length to be set is determined from distances between centers of mass of pupil regions corresponding to each of the plurality of captured images and the composite image.

* * * * *